(12) United States Patent
Ceccon

(10) Patent No.: US 6,474,262 B1
(45) Date of Patent: Nov. 5, 2002

(54) LITTER BOX

(76) Inventor: Bradley L. Ceccon, P.O. Box 213, Princeton, British Columbia (CA), V0N 1W0

( * ) Notice: Subject to any disclaimer, the term of this patent is extended or adjusted under 35 U.S.C. 154(b) by 0 days.

(21) Appl. No.: 09/689,864

(22) Filed: Oct. 13, 2000

Related U.S. Application Data

(60) Provisional application No. 60/159,203, filed on Oct. 13, 1999.

(51) Int. Cl.$^7$ .............................................. A01K 29/00
(52) U.S. Cl. ...................................................... 119/166
(58) Field of Search ................................ 119/165–167; 209/251, 260, 370, 372

(56) References Cited

U.S. PATENT DOCUMENTS

| | | | |
|---|---|---|---|
| 4,096,827 A | * | 6/1978 | Cotter ............................ 119/1 |
| 4,325,325 A | * | 4/1982 | Larter ............................ 119/1 |
| 4,325,822 A | | 4/1982 | Miller |
| 5,012,765 A | * | 5/1991 | Naso et al. ................... 119/166 |
| 5,168,834 A | * | 12/1992 | Buschur ....................... 119/166 |
| 5,184,574 A | * | 2/1993 | Kirk et al. ................... 119/162 |
| 5,211,133 A | | 5/1993 | Foley |
| 5,220,886 A | | 6/1993 | Hyde |
| 5,272,999 A | | 12/1993 | Nussle |
| 5,365,883 A | * | 11/1994 | Laviolette ..................... 119/170 |
| 5,499,610 A | * | 3/1996 | Bruner et al. ................. 119/166 |
| 5,531,186 A | | 7/1996 | Flood et al. |
| 5,577,462 A | * | 11/1996 | Korth .......................... 119/166 |
| 5,598,810 A | | 2/1997 | Lawton, III |
| 5,727,691 A | | 3/1998 | Vittrup |
| 5,785,000 A | * | 7/1998 | Barbary ....................... 119/166 |
| 5,797,346 A | * | 8/1998 | Lewis .......................... 119/166 |
| 5,806,461 A | | 9/1998 | Kiera |
| 6,269,772 B1 | * | 8/2001 | Mickey ....................... 119/166 |
| 6,401,660 B1 | * | 6/2002 | Wolff .......................... 119/165 |

FOREIGN PATENT DOCUMENTS

CA        2173510       4/1996

* cited by examiner

*Primary Examiner*—Charles T. Jordan
*Assistant Examiner*—Kimberly S. Smith
(74) *Attorney, Agent, or Firm*—Anthony C. Edwards

(57) ABSTRACT

The litter box of the present invention includes first and second mirror-image litter containers mountable on either side of a litter screen. Each container has an opening into a corresponding litter receiving cavity. The litter screen is removably mountable by a snap-on fit onto each of the first and second containers. The screen is sandwiched between the first and second containers when the first and second containers are mounted onto the screen in opposed facing array so that the openings of the containers are disposed against the screen. The screen completely covers the openings when so mounted. Each container has an aperture in a wall thereof. Each aperture is releasably closable by a corresponding manually operable door. Each cavity is shaped to funnel waste screened by the screen from the litter into the aperture upon manual inclination of cavity towards the aperture by a user.

14 Claims, 4 Drawing Sheets

LITTER BOX

CROSS REFERENCE TO RELATED APPLICATION

This application claims priority from U.S. Provisional Patent Application No. 60/159,203 filed Oct. 13, 1999 titled Litter Box.

FIELD OF THE INVENTION

This invention relates to an apparatus that is used as a small animal litter box, specifically, a litter box within which soiled granular litter material and animal faeces may be readily separated from the remaining unsoiled litter material for subsequent removal and disposal.

BACKGROUND OF THE INVENTION

Owners and breeders of small animals such as cats which spend a majority of their time indoors, enjoy the convenience which comes from training their animals to utilise a litter box. The inconvenience of this training however, is the need to frequently clean the litter box by separating the resulting animal waste and soiled litter from the unsoiled reusable litter material, removing the waste material from the litter box and depositing the waste in a disposal receptacle.

Litter boxes for pets such as cats and similar small animals abound in the prior art and have addressed the problem of separating animal faecal material and soiled litter from the balance of clean, reusable granular litter material in a manner which is similar to the present invention. The preferred manner of separating animal faecal material and soiled litter from the balance of clean, reusable granular litter material, being the employment of a pair of identical receptacles for receiving litter material intended for use by a pet and a screen which is used to filter the litter.

The receptacles are generally rectangular in shape and have a outwardly projecting flange surrounding an open face. The screen is sized so as to completely cover the receptacle opening and has formed upon opposed edges upper and lower receivers which receive opposed pairs of outwardly projecting perimeter flanges on the receptacle.

During the operation of the litter box, a first receptacle only of the pair of receptacles is used to retain litter material. When such litter material becomes soiled the screen is placed over the first receptacle. The second receptacle, which is empty, is inverted into opposed open facing relationship with the first receptacle, to act as a cover and is placed into engagement with the edges of the screen.

Soiled litter and animal faecal material are now separated from the balance of clean, reusable granular litter material by inverting the assembled receptacles and screen. The granular litter material passes through the screen by the force of gravity, which can be assisted by mild agitation of the inverted receptacles. The soiled litter and animal waste material is retained on the screen for subsequent disposal. The upper receptacle along with the attached screen is separated from the lower receptacle and inverted allowing the separated material to fall from the screen into the upper receptacle for subsequent discharge into a disposal container.

The applicant is aware of U.S. Pat. Nos. 4,325,822, 5,012,765 and 5,598,810 wherein the above noted features are disclosed and U.S. Pat. No. 5,806,461 which contains an animal access door and a paw cleaning walkway.

SUMMARY OF THE INVENTION

The present invention is a litter box for use by small household pets such as cats. The device may have its parts manufactured from resilient material such as plastic or the like. Primarily the device comprises substantially identical, and interchangeable, first and second litter receiving receptacles and a screen.

The first litter receiving receptacle is filled with absorbent granular litter material into which excreta is deposited by the pet. When cleaning of the litter box is required, which advantageously entails separating the excreta and clumped soiled litter from clean, reusable litter, the screen is fitted over the first litter receiving receptacle. The second litter receiving receptacle is then inverted and placed on top of the screen so that the first and second litter receiving receptacles are positioned in an opposed facing relationship. By rotating the assembled litter box so that the first litter receiving receptacle is uppermost, i.e. so as to invert the first litter receiving receptacle and with mild agitation, the clean granular litter will filter through the screen leaving excreta and clumps of soiled litter on the screen where such material may be easily be disposed by re-inverting of the fist receptacle and screen, and depositing of the excreta and clumps of soiled litter through a gated aperture in one side or end of the first receptacle. Advantageously the internal surface of the first receptacle adjacent the gated aperture is shaped to funnel the excreta and clumps towards and through the aperture so as to avoid the excreta and clumps becoming lodged in the corners of the first receptacle.

Thus, the litter box of the present invention includes first and second litter receiving receptacles, each having a base and a perimeter wall co-extensive with, and surrounding, the base. The perimeter wall defines a litter receiving chamber in each receptacle. An outwardly projecting flange member is integrally formed with the perimeter wall surrounding the litter receiving chamber at an edge of the walls remote from the base of the litter receiving receptacle. The first receptacle has granular litter material placed therein and the second receptacle is placed inverted over the first receptacle so as to place the respective receiving chambers in opposed facing relationship.

In one embodiment the gated aperture is releasably closed by a flap integrally formed in a portion of said perimeter wall, the flap flexibly hinged near to the base. The flap is held closed by a latch or other releasable closure means. A wedge-shaped convergence or funnel is formed between the perimeter wall and the base of each litter receiving receptacle, in proximity to the flap. The convergence or funnel diverges, that is, increases in width from a point remote from the flap to an intersection adjacent to the flap for funneling excreta toward the flap.

A deflector lip member projects inwardly integral with said perimeter wall surrounding said litter receiving chamber and extends co-planar with said outwardly projecting flange member. A screen is adapted to completely cover said receiving chamber and said outwardly projecting flange member of said litter receiving receptacles. The screen has handles, integrally formed with said screen, located medially on each of opposed ends of said screen, generally on ends opposite to the end containing said flap. Upper and lower wing portions of said handle extend at right angles to the respective faces of said screen.

The screen and containers are a snap together fitting rather than a fitting that required receivers or channels on the screen to be slid over the outer perimeter flange on the containers. The wings contain inwardly facing buttons which permit said outwardly projecting flange member of said litter receiving receptacles, when placed within the confines of said upper and lower wings of said handles and when forced vertically toward said screen, to push against said buttons to thereby force said wing portions slightly outwardly permitting said outwardly projecting flange member to be snapped into place between said buttons and said screen thereby retaining said receptacles in close proximity over said screen.

A review of the prior art fails to disclose, and it is an object of the present invention to provide an inwardly projecting perimeter lip which functions as a litter deflector around the open face of each litter receptacle, an opening or aperture in the end wall of each litter receptacle which is normally kept closed off by a hinged flap, gate or door, and converging funnel interior side walls in each receptacle adjacent to the end wall opening or aperture. The litter deflector returns litter which is scraped upwards along the sides of the litter receptacle by, for example, a cat during the act of burying the excreta, to thereby substantially reduce the associated spillage. The opening in the end wall permits the user to empty the waste material out of the container, after tumbling the assembled screen and litter container components, without first having to disassemble the screen from the waste receiving container. Further, the risk of feline or waste litter falling from the screen during disposal is eliminated. The converging funnel interior side walls adjacent to the end wall opening eliminate angular corners and serve to funnel waste material and soiled litter cleanly toward and through the end wall opening.

In summary, the litter box of the present invention includes first and second mirror-image litter containers mountable on either side of a litter screen. Each container has an opening into a corresponding litter receiving cavity. The litter screen is removably mountable by a snap-on fit onto each of the first and second containers. The screen is sandwiched between the first and second containers when the first and second containers are mounted onto the screen in opposed facing array so that the openings of the containers are disposed against the screen. The screen completely covers the openings when so mounted.

Each container has an aperture in a wall thereof. Each aperture is releasably closable by a corresponding manually operable door. Each cavity is shaped to funnel waste screened by the screen from the litter into the aperture upon manual inclination of cavity towards the aperture by a user.

In one aspect of the present invention the first and second containers are flat-bottomed containers having planar base surfaces. The openings of the containers are oppositely disposed on the containers to the base surfaces. Side walls extend contiguously around and between the base surfaces and the openings, and each aperture is formed in the side walls of each container. The side walls and base surfaces define the cavities. The side walls and base surfaces are formed as funnels adjacent each aperture in each container.

In one preferred embodiment, not intended to be limiting, the manually operable gate is a hinged flap releasably securable in a closed position by a closure means so as to seal each aperture. Each funnel may be wedge-shaped ramps extending along an intersection between the side walls and the base surface. Advantageously, the base surfaces and the openings on each container are substantially parallel. Further, each container may be substantially a parallelepiped, for example, rectangular.

In a second aspect, flexible releasable latches are mounted on the screen for releasably mounting the screen in the sandwich snap-on fit onto each container. The latches may be resilient oppositely disposed pairs of cantilevered members, cantilevered substantially orthogonally outwardly of opposite side edges of the screen for frictionally engaging corresponding edges of side walls of the first and second containers. The latches may frictionally engage the edges of the side walls by mating the edges between the screen and latching protrusions such as bumps on the cantilevered members and the screen. The cantilevered members may be described as wings, and may be mounted to the screen medially along each side edge of the screen.

In yet a further aspect, the openings of the containers are defined by a circumferential lip on each container extending around each opening. The circumferential lip extends radially inwardly into the opening so as to extend cantilevered over the cavity for deflecting litter thrown within the cavity from being thrown out through the opening.

DETAILED DESCRIPTION OF PREFERRED EMBODIMENTS

Figure 1:
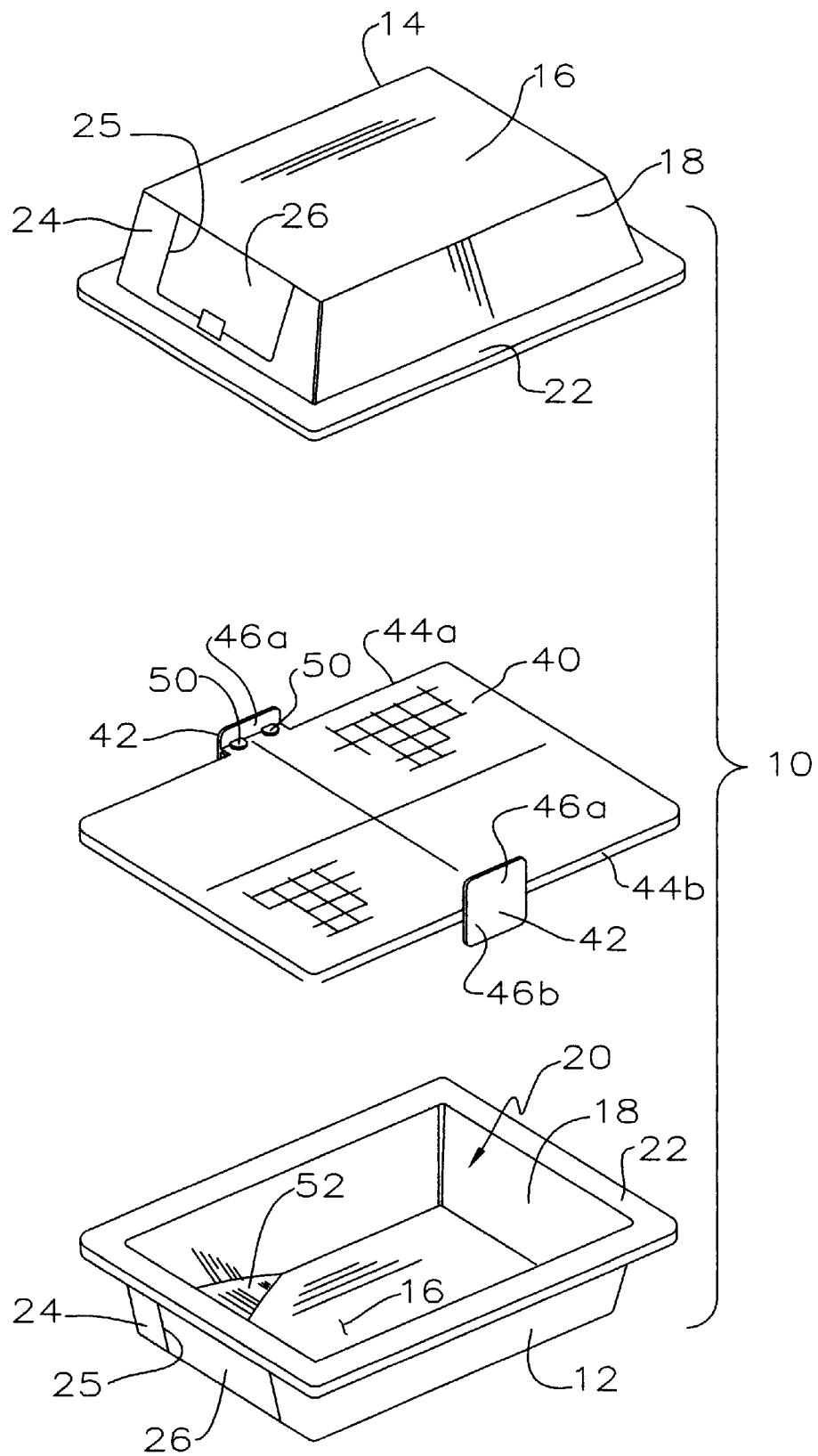
FIG. 1 is an exploded isometric view of the litter box of the present invention.
Figure 4:
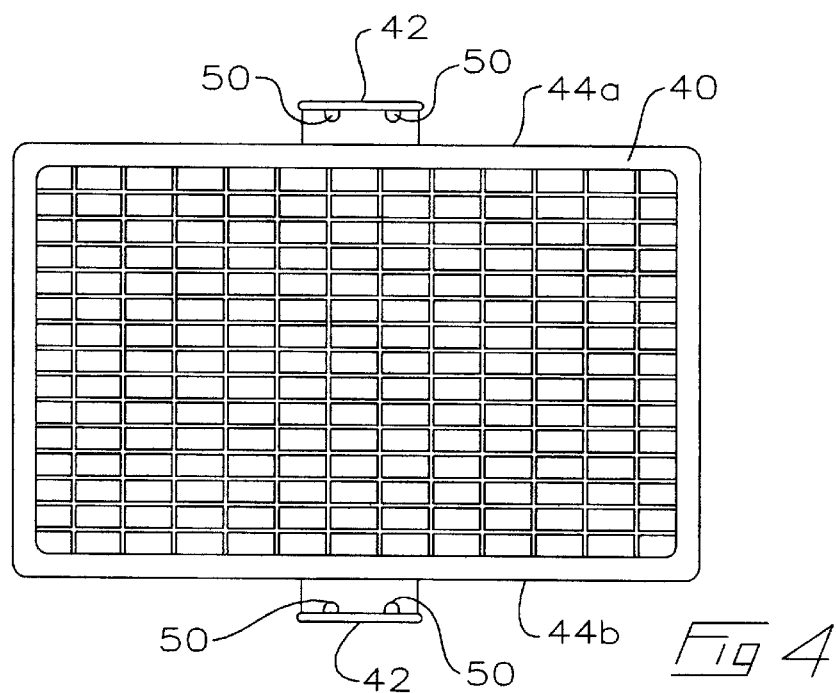
FIG. 4 is a plan view of the screen.
Figure 2:
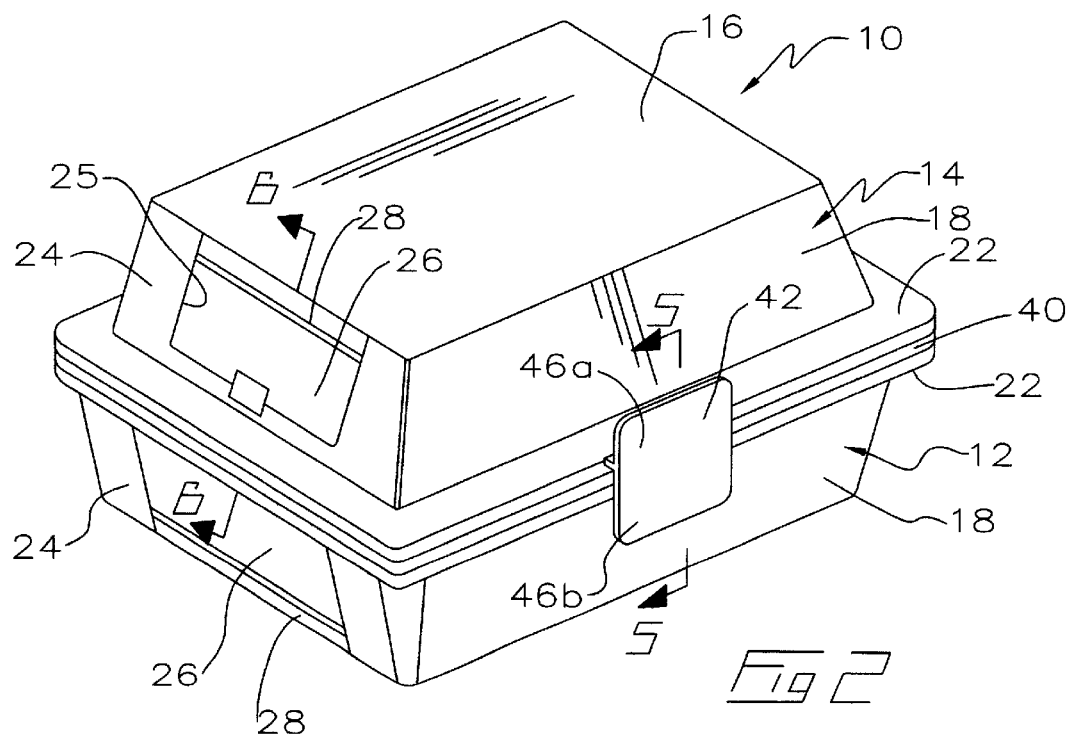
FIG. 2 is an isometric view of the assembled litter box of FIG. 1.
Figure 3:
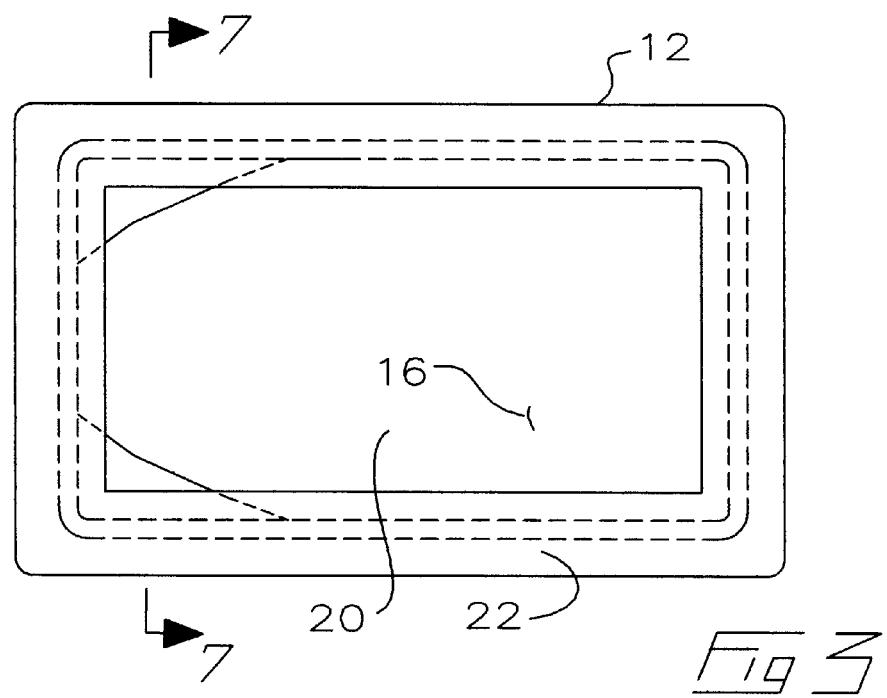
FIG. 3 is a plan view of a litter receiving receptacle.
Figure 5:
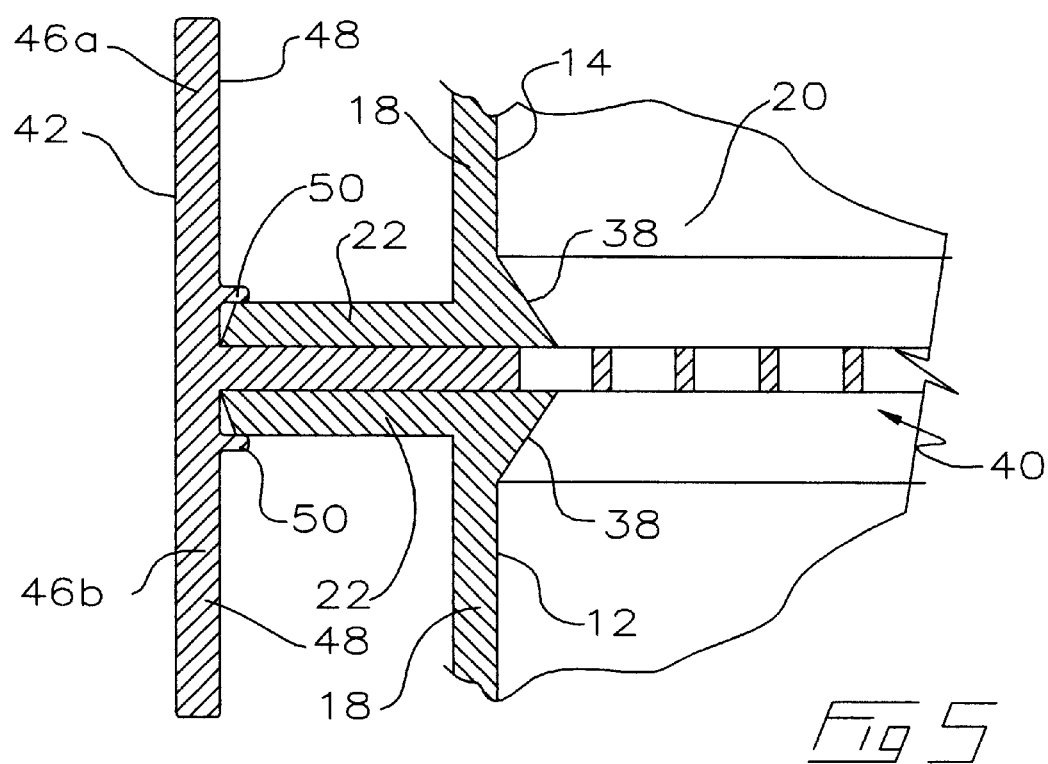
FIG. 5 is a sectional view on line 5—5 of FIG. 2.
Figure 7:
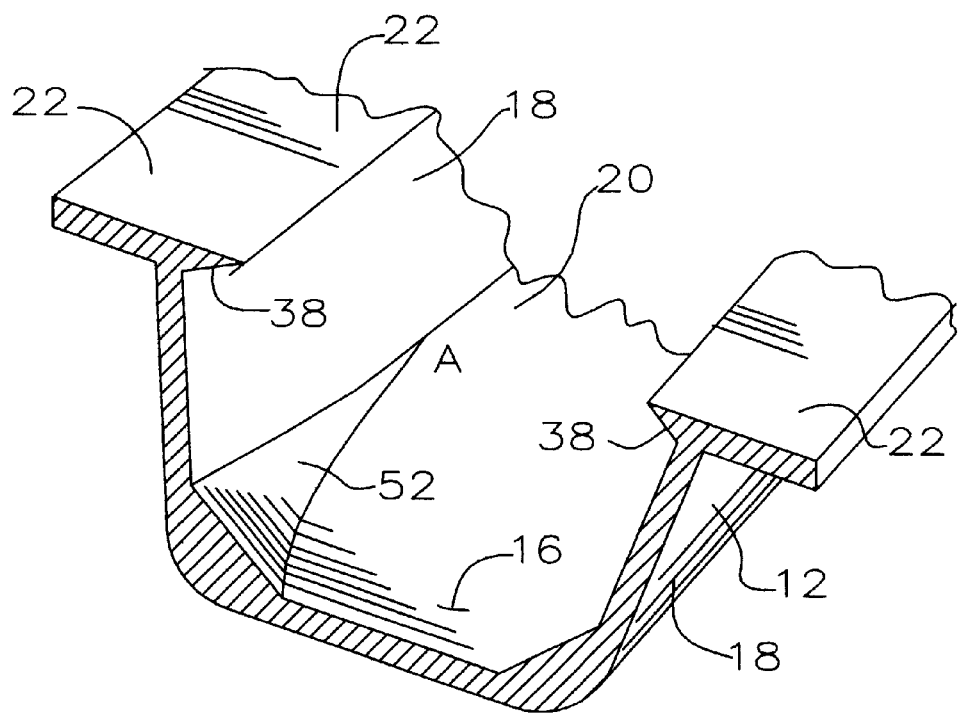
FIG. 7 is a sectional view on line 7—7 of FIG. 3.

As illustrated in the accompanying Figures, a litter box 10 manufactured from resilient material such as plastic or the like, has first and second litter receiving receptacles 12 and 14 respectively. The receptacles are identical and interchangeable. The first receptacle 12, which in the illustrated embodiment is the lower receptacle, is filled with absorbent granular litter material for receiving excreta deposited by a pet.

Receptacles 12 and 14 are generally rectangular in shape. Each have a base 16 and a perimeter wall 18 which co-extends from and surrounds the base 16, defining a litter receiving chamber 20. The perimeter wall 18 has an integrally formed outwardly projecting flange member 22, which surrounds the litter receiving chamber 20 at the edge of the perimeter wall 18 remote from the base 16.

Figure 6:
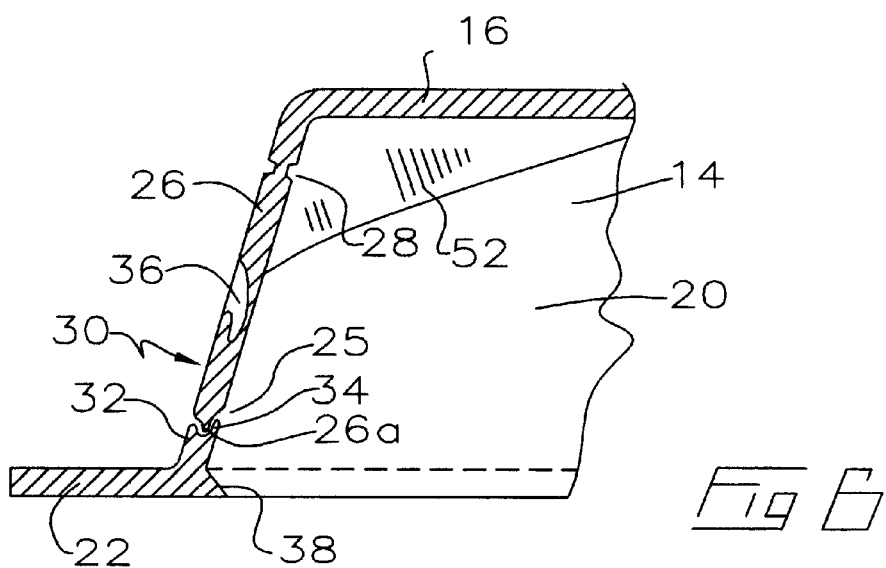
FIG. 6 is a sectional view on line 6—6 of FIG. 2.

An end wall 24 of the perimeter wall 18 has an aperture 25 which is normally kept closed by flap 26 which may be integrally formed within end wall 24. As may be seen more clearly in FIG. 6, flap 26 has a flexible hinge 28 near to base 16. A closure 30 is positioned near flange member 22. The closure may take various forms; in the form illustrated however, a projection such as lip 32 is formed at the outer face of end wall 24 and a stop 34 is formed at the inner face. A corresponding lip 26a is formed on the distal or free edge of flap 26. Lip 26a retains flap 26 against stop 34 in its closed position and inhibits accidental opening. A finger recess 36 or the like may be formed in flap 26 to facilitate grasping and opening of flap 26 by a user.

An inwardly projecting deflector lip member 38 is integrally formed with the perimeter wall 18 and surrounds the litter receiving chamber 20. Lip 38 extends coplanar with flange member 22. During the excreta covering process, common to many small household pets including cats, the granular litter material tends to be thrown about. Lip 38 intercepts such thrown litter material preventing spillage by redirecting this litter material back into the receptacle.

A screen 40 which is used to filter the soiled litter material can be placed over receiving chamber 20 and flange member 22. Screen 40 has a handle 42 formed integrally with and located medially on each of opposite sides 44a and 44b. The handle 42 has upper and lower wings 46a and 46b respectively, extending at right angles to the respective adjacent faces of screen 40. Upper and lower wings 46a and 46b respectively, have formed on the inner face 48 thereof, inwardly projecting buttons 50. Buttons 50 are formed spaced a distance from the respective adjacent faces of the screen so as to permit retention of flange member 22, when the litter receiving receptacles 12 and 14 are, firstly, placed within the confines of the upper and lower wings and secondly, thereafter forced vertically toward and onto the screen. Frictional engagement between flange member 22 of the receptacle and the corresponding button 50 on the handle results in the wing portions 46a and 46b being forced slightly laterally outwardly, permitting the receptacles to be snapped into place in close proximity over the screen 40 and retained in position by buttons 50 releasably retaining the outer edges of flange members 22.

When cleaning of the first receptacle 12 is required, which entails separating the excreta and clumped soiled litter from clean, reusable litter, screen 40 is fitted over first receptacle 12, and pressed downwardly to force corresponding buttons 50 past the outer edges of flange member 22. The second litter receiving receptacle 14, which is empty, is then inverted and placed on top of screen 40, between handles 42. Inverted receptacle 14 is then pressed downwardly to force flange member 22 past buttons 50. First and second receptacles 12 and 14 are then releasably secured together in an open facing relationship. Soiled litter and animal faecal material can now be separated from the balance of clean, reusable granular litter material by inverting the assembled receptacles and screen through 180 degrees. With mild agitation, the clean granular litter will filter through screen 40, leaving excreta and clumps of soiled litter on the screen for subsequent disposal.

After filtering, second receptacle 14 along with the attached screen is separated from the counterpart first receptacle 12 and tuned upside-down. This action results in the fecal material and soiled litter dropping from screen 40 into the inverted second receptacle 14. The corresponding flap 26 can then be opened and the receptacle tipped, permitting such waste material as has been separated by the screen to pass outwardly of the receptacle through aperture 25 for disposal.

A difficulty experienced in the development of the present invention is that during the emptying of the waste material, receptacles having abrupt corners near the discharge flap tend to accumulate litter and waste material in these corners. This requires some effort to clear the waste material from the corners. To this end a convergence 52 of the perimeter wall 18 with the base 16 of each litter receiving receptacle is provided in proximity to aperture 25 and flap 26. The convergence advantageously is in the shape of a wedge, increasing in width from a vertex A remote from flap 26, so as to diverge to an intersection with, or adjacent to, aperture 25 and flap 26. This convergence eliminates a right angle corner adjacent aperture 25 and funnels the excreta toward the aperture, eliminating the opportunity for such material to become lodged in a corner of the receptacle.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A litter box comprising:
   first and second mirror image litter containers, each said container having an opening into a corresponding litter receiving cavity,
   a litter screen removably mountable by a snap-on fit onto each of said first and second containers so as to be sandwiched between said first and second containers when said first and second containers are mounted onto said screen in opposed facing array wherein said openings of said containers are disposed against said screens said screen completely covering said openings when so mounted,
   each said first and second container having an aperture in a wall thereof, each said aperture releasably closable by a corresponding manually operable door,
   each said cavity shaped to funnel waste screened by said screen from said litter into said aperture upon manual inclination of said cavity towards said aperture by a user.

2. The litter box of claim 1 wherein said first and second containers are flat-bottomed containers having planar base surfaces and said openings are oppositely disposed on said containers to said base surfaces, and wherein side walls extend contiguously around and between said base surfaces and said openings, and wherein each said aperture is formed in said side walls of each said container, and wherein each said side walls and each said base surface define each said cavity, and each said side walls and each said base surface are formed as a funnel adjacent each said aperture in each said container.

3. The litter box of claim 2 wherein each said manually operable door is a hinged flap releasably securable in a closed position by a closure means so as to seal each said aperture.

4. The litter box of claim 2 wherein each said funnel comprise wedge-shaped ramps extending along an intersection between each said side walls and each said base surface.

5. The litter box of claim 2 wherein each said base surface and each said opening on each said container are substantially parallel.

6. The litter box of claim 5 wherein each said container is substantially a parallelepiped.

7. The litter box of claim 1 further comprising flexible releasable latches mounted on said screen for releasably mounting said screen onto each said container.

8. The litter box of claim 7 wherein said latches are resilient oppositely disposed pairs of cantilevered members cantilevered substantially orthogonally outwardly of opposite side edges of said screen for frictionally engaging corresponding edges of side walls of said first and second containers.

9. The litter box of claim 8 wherein said latches frictionally engage said edges of said side walls by mating said edges between latching protrusions on said cantilevered members and said screen.

10. The litter box of claim 9 wherein said latching protrusions are bumps.

11. The litter box of claim 8 wherein said cantilevered members are wings and wherein said wings are mounted to said screen medially along an opposite pair of said side edges of said screen.

12. The litter box of claim 1 wherein said openings of said containers are defined by a circumferential lip on each said container extending around each said opening, and wherein each said circumferential lip extends radially inwardly into corresponding each said opening so as to extend cantilevered over each said cavity for deflecting litter thrown within each said cavity from being thrown out through corresponding each said opening.

13. A litter box comprising:

first and second mirror image litter containers, each said container having an opening into a corresponding litter receiving cavity, a litter screen removably mountable by a snap-on fit onto each of said first and second containers so as to be sandwiched between said first and second containers when said first and second containers are mounted onto said screen in opposed facing array wherein said openings of said containers are disposed against said screen, said screen completely covering said openings when so mounted, each said first and second container having an aperture in a wall thereof, each said aperture releasably closable by a corresponding manually operable door, each said cavity shaped to funnel waste screened by said screen from said litter into said aperture upon manual inclination of cavity towards said aperture by a user, wherein said first and second containers are flat-bottomed containers having planar base surfaces and said openings are oppositely disposed on said containers to said base surfaces, and wherein side walls extend contiguously around and between said base surfaces and said openings, and wherein each said aperture is formed in said side walls of each said container, and wherein each said side walls and each said base surface define each said cavity, and each said side walls and each said base surface are formed as a flannel adjacent each said aperture in each said container, wherein each said flannel comprise wedge-shaped ramps extending along an intersection between each said side walls and each said base surface.

14. A litter box comprising:

first and second mirror image litter containers, each said container having an opening into a corresponding litter receiving cavity, a liter screen removably mountable by a snap-on fit onto each of said first and second containers so as to be sandwiched between said first and second containers when said first and second containers are mounted onto said screen in opposed facing array wherein said openings of said containers are disposed against said screen, said screen completely covering said openings when so mounted, each said first and second container having an aperture in a wall thereof, each said aperture releasably closable by a corresponding manually operable door, each said cavity shaped to funnel waste screened by said screen from said litter into said aperture upon manual inclination of cavity towards said aperture by a user, wherein said first and second containers are flat-bottomed containers having planar base surfaces and said openings are oppositely disposed on said containers to said base surfaces, and wherein side walls extend contiguously around and between said base surfaces and said openings, and wherein each said aperture is formed in said side wails of each said container, and wherein each said side wells and each said base surface define each said cavity, and each said side walls and each said base surface are formed as a funnel adjacent each said aperture in each said container, wherein each said manually operable door is a hinged flap releasably securable in a closed position by a closure means so as to seal each said aperture.

* * * * *